United States Patent [19]

Jackson et al.

[11] 4,253,855

[45] Mar. 3, 1981

[54] AIR FILTER

[75] Inventors: Richard E. Jackson; John E. Sparks, both of Lubbock, Tex.

[73] Assignee: Horn and Gladden Lint Cleaner, Lubbock, Tex.

[21] Appl. No.: 15,361

[22] Filed: Feb. 26, 1979

[51] Int. Cl.³ ............................................. B01D 46/04
[52] U.S. Cl. ...................................... 55/290; 55/302; 55/337; 55/351
[58] Field of Search .................. 55/21, 96, 97, 270, 55/283, 290, 291, 293, 302, 337, 351, 352, 400

[56] References Cited

U.S. PATENT DOCUMENTS

| | | | |
|---|---|---|---|
| 360,129 | 3/1887 | Whitehill | 55/290 |
| 1,610,053 | 12/1926 | Holmes | 55/400 |
| 1,697,647 | 1/1929 | Hancock et al. | 55/290 |
| 2,474,478 | 6/1949 | Hart, Jr. | 55/290 |
| 2,516,680 | 7/1950 | Culpepper | 55/290 |
| 2,795,291 | 6/1957 | Pierce | 55/290 |
| 3,339,349 | 9/1967 | Otto, Jr. | 55/290 |
| 3,360,907 | 1/1968 | Clark, Jr. et al. | 55/283 |
| 3,499,267 | 3/1970 | King, Jr. et al. | 55/290 |
| 3,745,748 | 7/1973 | Goldfield et al. | 55/97 |
| 3,887,344 | 6/1975 | Smith | 55/294 |
| 3,977,847 | 8/1976 | Clark | 55/96 |
| 4,045,194 | 8/1977 | Ferri | 55/290 |

*Primary Examiner*—David L. Lacey
*Attorney, Agent, or Firm*—Wendell Coffee

[57] ABSTRACT

An air filter having a counter rotating drum, i.e., the rotation of the drum is opposite the tangential intake of air. The intake air has about 1 lb. of rock wool fibers per $10^7$ cu. ft. of air sometimes at about 100% relative humidity. The fibers are doffed from the drum by suction nozzle which are adjacent to the drum at the bottom of the filter housing. The drum screen is cleaned by periodically jetting hot dry air at 120 psig through the screen into the suction nozzles.

7 Claims, 4 Drawing Figures

AIR FILTER

CROSS REFERENCE TO RELATED APPLICATIONS:

None.

BACKGROUND OF THE INVENTION (1) Field of the Invention

This invention relates to filtering particles from air and cleaning the filter screen with a fluid blast.

(2) Description of the Prior Art

In the manufacture of mineral fibers, commonly known as rock wool, the manufactured fibers are carried in an air stream, the air sometimes being about 100% relative humidity. After the fibers are separated from the air, the air will still retain about 1 lb. of fibers for every $10^7$ cu. ft. of air. It is desirable to remove these fibers from the air before the air is discharged.

In the rock wool manufacture process in common use today the air is separated from the fibers. It is necessary that there be no appreciable back pressure applied to the air-fiber separation machines. Therefore, the pressure drop across the filter screen should be less than 1.5 inches water pressure (3.8 cm water).

Previous workers in the field have attempted to filter the fibers from the air stream using a rotating drum filter and doffing the fibers from the filter screen by brushes. The fibers as carried in the air stream will be sticky or adhesive and they tend to adhere to the screen and doffing brushes.

In filtering the air for textile plants, revolving drum air filters are used. In some instances, these air drums have a suction nozzle extending substantially the full length of the drum for removing the textile fibers from the air filter. Normally, these drums rotate in the same direction as the air which often enters the housing tangentially of the drum.

Before this application was filed, a search was made in the United States Patent and Trademark Office. The following patents were discovered on this search:

U.S. Pat. No. 350,286, Bigler
U.S. Pat. No. 2,474,478, Hart
U.S. Pat. No. 2,689,020, Hersey
U.S. Pat. No. 2,875,846, Yonkers
U.S. Pat. No. 3,339,347, Otto
U.S. Pat. No. 3,345,805, Sherrill
U.S. Pat. No. 4,045,194, Ferri SHERRILL discloses a filter for filtering the air in textile plants. A suction nozzle is positioned adjacent to the filter. The suction nozzle extends for about ¼ the length of the drum. The nozzle is moved in steps to five overlapping positions across the drum length.

BIGLER discloses a dust collector for rotating drum filters. His drum rotates opposite the direction of the tangentially entering air. The dust is removed from the filter by a knocker.

FERRI discloses an air filter for fibers and dust and the flow is from the inside of the drum to the outside of the drum. A pair of suction nozzles, which together extend for what appears to be less ¼ the total length of the drum are opposed by air blast nozzles. The air blast nozzles and suction nozzles are mounted upon common structure which is moved back and forth along the length of the drum so that a portion of the drum is cleaned of the dust and fibers by the suction on the suction nozzle and the air blast on the air nozzles. As understood, the air blast and suction operates at all times over that strip or segment of the drum about which they are located. The drum is supported and rotated by circumferential rollers.

The remaining patents do not appear to applicant to be as pertinent as those specifically discussed above.

SUMMARY OF THE INVENTION (1) New and Different Function

We have discovered that an efficient filter can be constructed and operated if the filter is rotated constantly in a direction opposed to the tangential air intake. The suction is always operated to remove the fibers from the surface of the screen. The suction nozzle is slightly closer to the screen on the rotational departing side than it is on the rotational approaching side. The suction nozzle is located at about bottom dead center and the housing curves smoothly into the sides of the suction nozzle. The pressure drop across the screen is monitored and when the pressure drop exceeds a pre-established limit, such as 1" of water (2.5 cm water), the screen is cleaned.

The screen is cleaned by jetting hot dry air through the screen under about 120 psig (6k torr). Although we prefer to use hot dry air to clean the screens, it will be understood that other fluids could be used. An example of other fibers in the air might be textile fibers (either natural such as cotton lint or synthetic such as polyester or mineral fibers such as asbestos fibers). The fluid jet through the screen is maintained for a full rotation of the screen and, then, assuming that the pressure drop is again below the critical pre-set amount, the cleaning jet of air through the screen is discontinued.

With this system, we find that we can effectively use a 40 mesh screen where previous workers in the field considered a 100 mesh screen necessary.

Thus it may be seen that the total function of our combination of methods and the total function of the combination of the structure we use, far exceeds the sum of the functions of the individual steps or structures such as the rotating drum, suction nozzle, etc.

(2) Objects of this Invention

An object of this invention is to filter impurities from the air.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
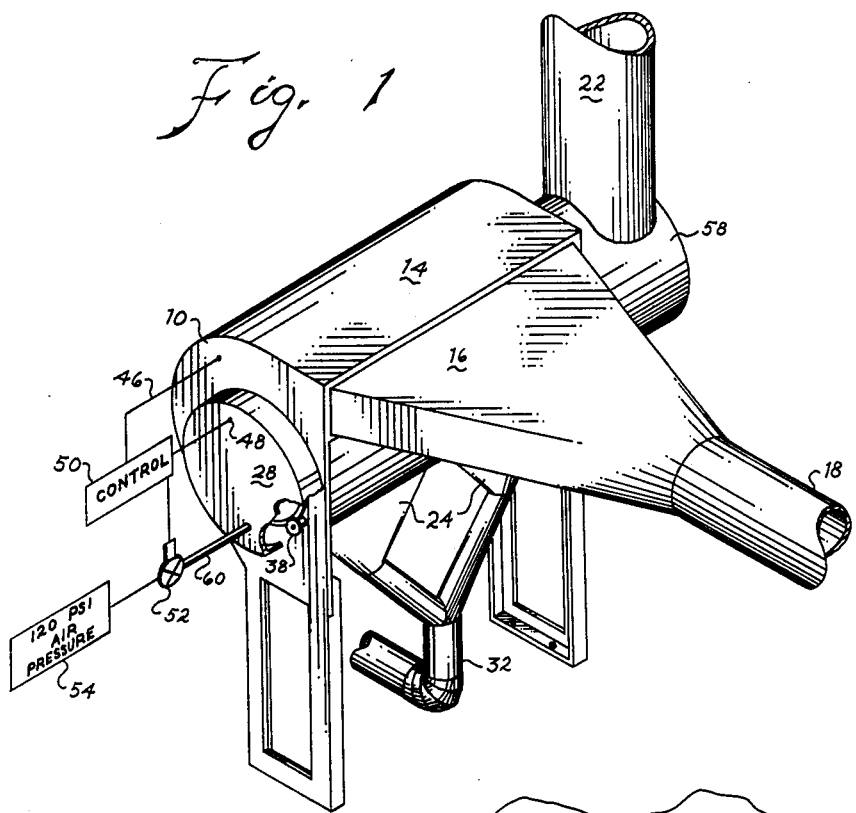
FIG. 1 is a perspective view of a filter according to our invention.

Referring to the drawings, the housing will include end plates 10 and 12 together with the scroll 14. The scroll 14 is formed to have tangential inlet 16. The air is conducted to the inlet by inlet ducts 18. The air enters the housing, passes through drum 20 and axially out one or both ends of the drum to outlet duct 22. The drawings show only one outlet duct but a duct at each end will reduce the back pressure of the unit. Suction nozzle 24 is at about the extreme lower point or bottom of the housing, axially below the axis of the drum. The suction nozzle has mouth 26. As illustrated, there might be considered to be two suction nozzles or one suction nozzle which is divided in the center. In any event, the suction nozzle and the mouth 26 extends substantially for the entire length of the housing and which will be the entire length of the drum 20.

Figure 4:
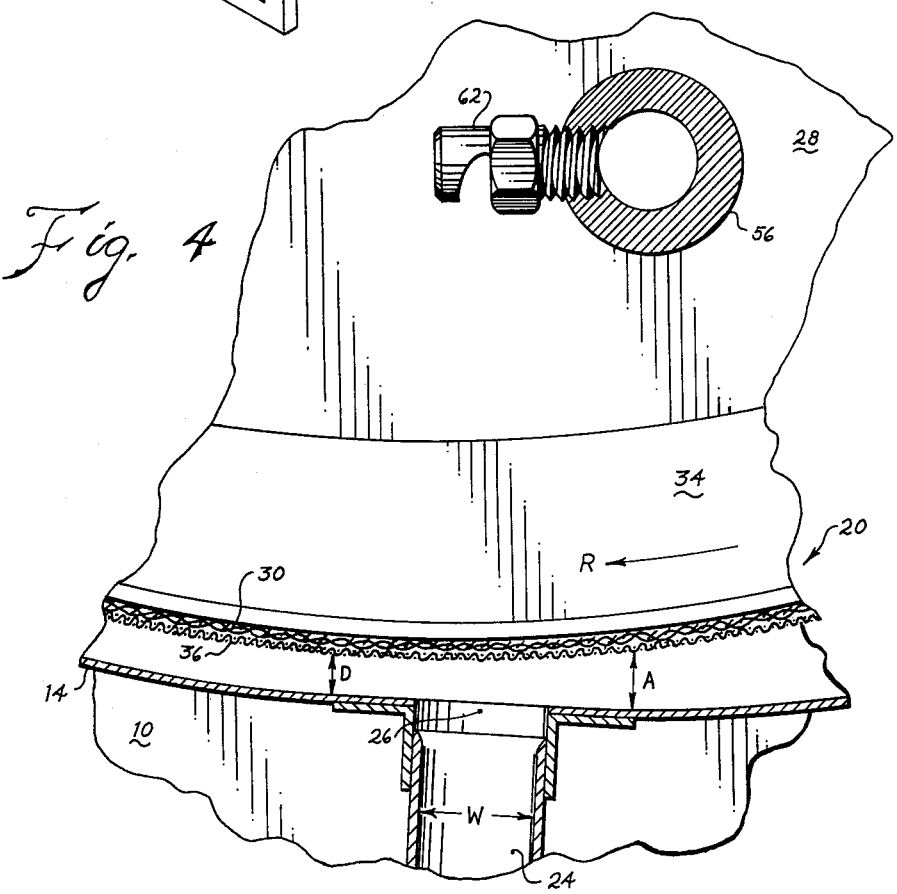
FIG. 4 is a cross sectional detail of the suction nozzle and high pressure nozzles which would be the same as in FIG. 2 except enlarged.
Figure 2:
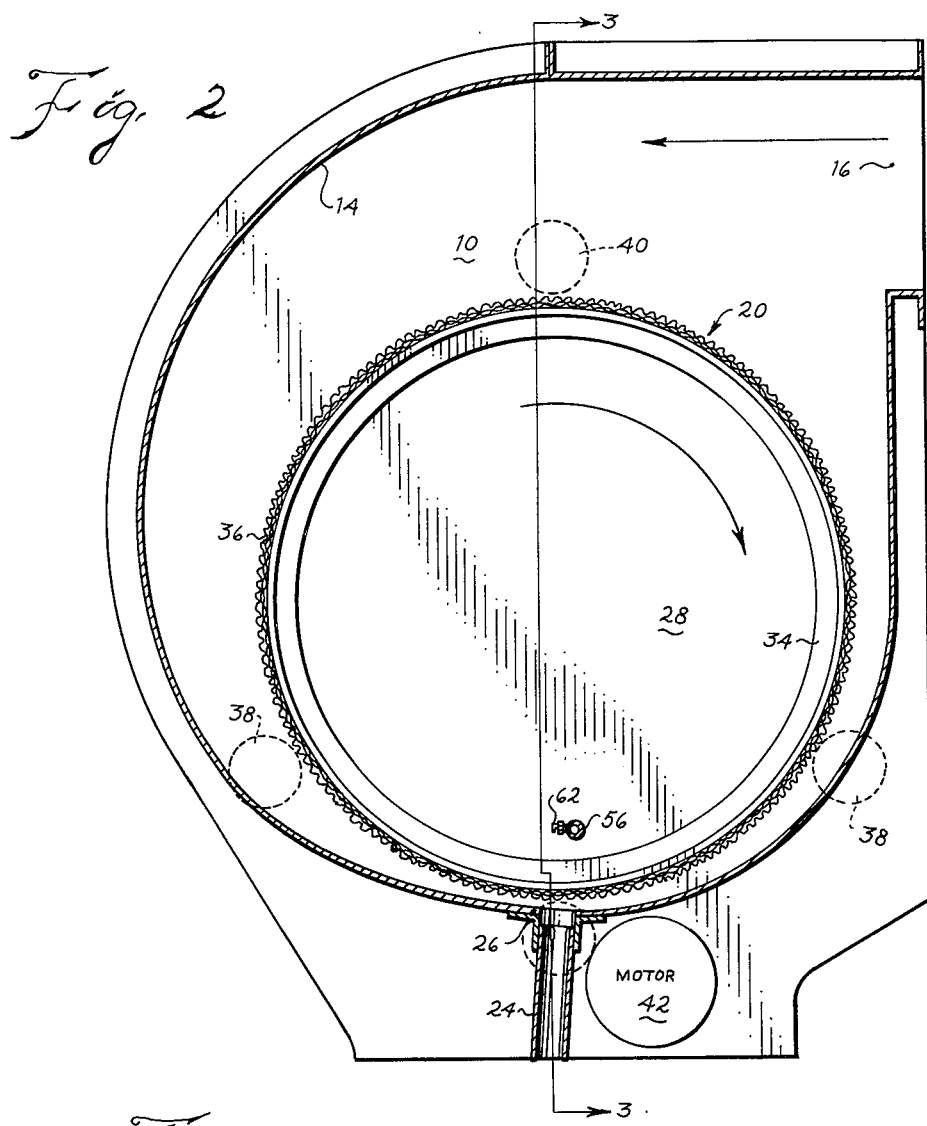
FIG. 2 is a cross section of a filter according to our invention taken substantially along line 2—2 of FIG. 3.
Figure 3:
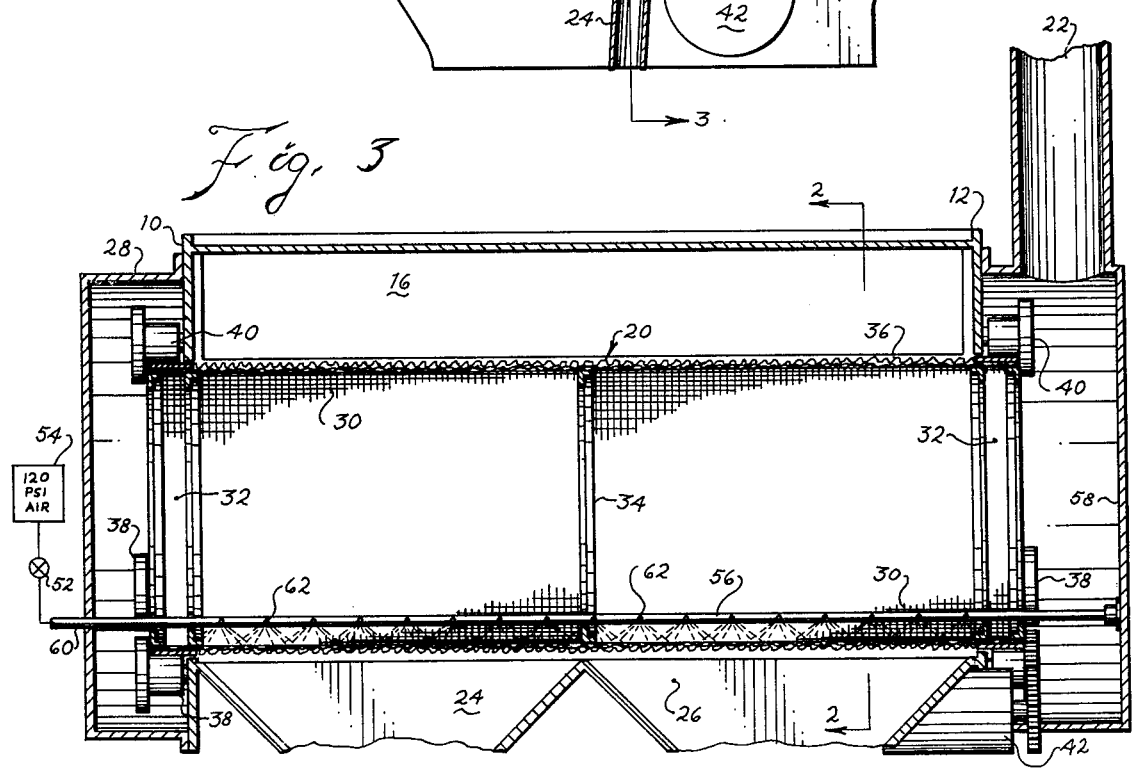
FIG. 3 is an axial section of a filter according to our design taken substantially along line 3—3 of FIG. 2.

The mouth 26 of the suction nozzle 24 is inside the housing or scroll 14 and the housing in the form of the scroll makes a smooth curve on each side of the mouth as seen more particularly in FIGS. 2 and 4. The end plate 10 opposite the outlet duct 22 is closed by cover 28. The suction nozzle 24 is connected by suitable suction duct 32 to suction means. Thus, the duct 32 is part of a suction means for producing reduced pressure upon the suction nozzle. The suction duct 32 is part of means for maintaining a suction at the suction nozzle 24 of about 6" of water. This may be expressed as a pressure of about MINUS 6" of water.

The drum 20 is constructed of the heavy wire screen or expanded metal lath 30 substantially between the end plates 10 and 12. The lath portion is called the main portion. From outside of the end plates 10 and 12 there is an extension 32 made of sheet metal. Both the main expanded metal lath portion and extensions 32 are cylindrical. The drum is reinforced or stiffened by circumferential rings 34 conveniently made of angles. These rings 34 extend inside of the drum so that the outside is smooth and unobstructed. The expanded metal lath 30 of the main portion is covered by filter screen 36. We prefer to use a 40 mesh woven wire filter screen. However, those having ordinary skill in the art will understand that others may prefer to use other size woven metal screens or they may prefer to use a textile material.

Three rollers 38 are journalled to the housing at the end plates 10 and three rollers 38 are journalled to the end plates 12 to support the drum 20. An additional roller 40 is positioned at the top to hold the drum in the location. The rollers extend outward of the housing, i.e., on the outside of the housing. At least one of the lower rollers 38 upon each end plate 10 and 12 is attached to motor 42 to rotate the roller and, thus, the drum. Those having ordinary skill in the art will understand that belt or chain drives between the rollers 38 might be utilized to rotate the drum. The motors are such that the drum is rotated opposite the direction of the inlet air through the inlet duct 18. I.e., the drum has a counter rotation with respect to the inlet air. The rotation of the rollers to rotate the drum is well within the ordinary skill of the art. The drum rotates at about 1 rpm. A suitable seal (not shown for clarity) is provided between the drum and the housing at the end plates 10 and 12.

As may be clearly seen from the drawings, and particularly FIG. 2, the air inlet 16 into the housing is directed into a plenum. I.e., it is directed into the housing between the drum 20 and scroll 14. Also, it may be seen that a straight line flow of the air would impinge against the housing and the air is not directed onto the drum.

We have had good success with doffing or removing the fibers from the filter screen 36 by using a nozzle about ¾" (2 cm) wide as shown by the nozzle width W in FIG. 4. The nozzle mouth 26 is placed about ⅜" (10 mm) from the filter screen at the approach rotation side of the mouth shown by the dimension A in FIG. 4. The distance of the mouth from the filter screen 36 upon the depart side of the mouth shown as distance D is about ¼" (6 mm).

Although we have had good success of removing the fibers from the screen with the suction nozzle mouth as described, still a problem exists because the tendency of the rock wool fibers to adhere or stick to the filter screen. Therefore, it is necessary to periodically clean the screen. We prefer to have a means for determining the pressure drop across the screen. This is accomplished by having air tap 46 into the housing outside the drum and a second air tap 48 through the cover 28. These two air taps are connected to control device 50 to determine the difference in the two pressures at the taps 46 and 48 and this difference will be the pressure drop across the screen 36. When the pressure drop exceeds a predetermined amount, e.g., 1" water (2.5 cm of water) the control device actuates air valve 52 to clean the filter screen 36. The filter screen is cleaned by a blast of air at about 120 psig (6 k torr) through the filter screen. Air is made available through the air valve 52 from a source of air under pressure 54.

Manifold 56 is in the form of a pipe or tube which extends within the vicinity of the suction nozzle mouth 26. The manifold 56 is supported and held in place by attachment to transition 58 of duct 22 on the end plate 12 and cover 28 on the end plate 10. Suitable conduit or pipe 60 extends from the manifold 56 to the air valve 52.

A plurality of pressure nozzles 62 are attached to the manifold 56. Each pressure nozzle 62 produces a fan shaped jet or blast of air directed directly into the suction nozzle 24 through the mouth 26. The pressure nozzles are located sufficiently close together so that the jets overlap. The entire length of the filter screen 36 on the drum 20 is subjected to a jet or blast of air when the valve 52 is open. The jetting is simultaneous for the full length of the screen and not over a portion only of the screen.

The inlet air arriving through inlet 16 carries less than 1 pound of rock wool fibers per $10^7$ cu. ft. of air. The air will have a relative humidity of about 100%. The air velocity through the screen is about 3600 cfm/sq. ft. Therefore, it may be seen that about 1.75 lbs. of fiber per hour will be deposited for each 100 sq. ft. of screen.

The frequency by which the screen is cleaned is not upon a set time but is only when needed, i.e., when the pressure drop across the screen exceeds a predetermined amount. The control device 50 is such as to hold the air valve 52 open for a length of time equal to that required for a full revolution of the drum 20. The air source 54 is a source of hot dry air. By hot we mean a temperature of about 100° F. (38° C.) having a relative humidity of less than 50%. The criteria of the air from source 54 is that no condensation forms upon the screen 36. I.e., when the air is jetted from pressure nozzle 62 and reduces its pressure, it will be cooler. If the humidity of the compressed air is high it will result in a condensation forming which will make it almost impossible to remove the fibers from the screen.

As an aid to correlating the terms of the claims to the exemplary drawing, the following catalog of elements is provided:

| Rotation R | Width W | Approach A | Departure D |
|---|---|---|---|
| 10 end plates | | 36 filter screen | |
| 12 end plates | | 38 roller - main | |
| 14 scroll | | 40 roller - top | |
| 16 air inlet | | 42 motor | |
| 18 inlet duct | | 46 air tap housing | |
| 20 drum | | 48 air tap cover | |
| 22 outlet duct | | 50 control device | |
| 24 suction nozzle | | 52 air valve | |
| 26 mouth | | 54 source of air | |
| 28 cover | | 56 manifold | |
| 30 lath | | 58 transition | |
| 32 extension | | 60 pipe | |
| 34 ring | | 62 pressure nozzle | |

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

We claim as our invention:
1. In a filter having
   a. a drum having a length and an axis,
   b. rotation means for rotating the drum about its axis in a given direction of rotation,
   c. a filter screen on the drum,
   d. a housing surrounding said drum and defining a plenum between the housing and the drum,
   e. a tangential air inlet into the housing,
   ee. an air outlet on the housing fluidly connected to the interior of the drum,
   f. a suction nozzle on the housing adjacent the drum extending substantially the full length of the drum,
   g. and suction means for producing a reduced pressure upon the suction nozzle;
the improved structure comprising:
   h. a manifold within the drum,
   j. a series of pressure nozzles
      (i) attached to the manifold and
      (ii) constructed and arranged to produce a jet of high velocity air through the filter screen into the suction nozzle,
   k. and a source of air under pressure attached to said manifold,
   m. said suction nozzle having a mouth adjacent said drum,
   n. said mouth spaced at least about 6 mm from said drum,
   o. said air inlet being constructed and arranged with respect to said drum so that a straight line air flow through the inlet would impinge agains the housing and not onto the drum,
   p. said rotation means being constructed and arranged so as to rotate said drum opposite the direction the air enters said tangential air inlet.
2. The filter as defined in claim 1 further comprising:
   m. said drum extending axially beyond the housing on each end,
   n. rollers journalled to the outside of the housing contacting said drum,
   o. said rollers forming part of said rotation means.
3. The filter as defined in claim 1 further comprising:
   m. said suction means capable of maintaining a pressure of about minus 6 inches water at the suction nozzle.
4. The filter as defined in claim 1 further comprising:
   o. said housing curving smoothly from the mouth on each side thereof.
5. The filter as defined in claim 4 further comprising:
   p. said suction nozzle mouth being at least about 2 cm wide.
6. The filter as defined in claim 5 further comprising:
   r. said suction means capable of maintaining a pressure of about minus 6 inches water at the suction nozzle.
7. The filter as defined in claim 6 further comprising:
   s. said drum extending axially beyond the housing on each end,
   t. rollers journalled to the outside of the housing contacting said drum,
   u. said rollers forming part of said rotation means.

* * * * *